US011061550B2

United States Patent
Marin et al.

(10) Patent No.: US 11,061,550 B2
(45) Date of Patent: *Jul. 13, 2021

(54) NATURAL LANGUAGE TASK COMPLETION PLATFORM AUTHORING FOR THIRD PARTY EXPERIENCES

(71) Applicant: Microsoft Technology Licensing, LLC, Redmond, WA (US)

(72) Inventors: Marius Alexandru Marin, Seattle, WA (US); Paul Anthony Crook, Bellevue, WA (US); Nikhil Holenarsipur Ramesh, Bellevue, WA (US); Vipul Agarwal, Bellevue, WA (US); Omar Zia Khan, Bellevue, WA (US); Alexandre Rochette, Montreal (CA); Jean-Philippe Robichaud, Mercier (CA); Ruhi Sarikaya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,441

(22) Filed: Mar. 26, 2020

(65) Prior Publication Data

US 2020/0225839 A1 Jul. 16, 2020

Related U.S. Application Data

(63) Continuation of application No. 15/043,317, filed on Feb. 12, 2016, now Pat. No. 10,635,281.

(51) Int. Cl.
*G06F 3/0484* (2013.01)
*G06F 8/34* (2018.01)
(Continued)

(52) U.S. Cl.
CPC ........ *G06F 3/04847* (2013.01); *G06F 3/0482* (2013.01); *G06F 3/04883* (2013.01);
(Continued)

(58) Field of Classification Search
CPC ............... G06F 3/04847; G06F 3/0482; G06F 3/04883; G06F 3/167; G06F 9/451; G06F 8/34; G06F 40/40
See application file for complete search history.

(56) References Cited

U.S. PATENT DOCUMENTS

| 2008/0010069 A1* | 1/2008 | Katariya ................. G06F 9/451 704/257 |
| 2014/0379326 A1* | 12/2014 | Sarikaya ................. G10L 15/18 704/9 |

(Continued)

FOREIGN PATENT DOCUMENTS

CN 102792320 A 11/2012

OTHER PUBLICATIONS

"Office Action Issued in European Patent Application No. 17705535.7", dated Dec. 19, 2019, 5 Pages.
(Continued)

*Primary Examiner* — Roland J Casillas

(57) ABSTRACT

Aspects herein provide third party application authors with a user interface authoring platform that automates and simplifies a task definition process while also providing the ability to leverage pre-existing language understanding models and canonicalization and resolution modules that are provided by the operating system on which the CU system resides or as provided by other third parties. In particular, the present disclosure provides a method and system for authoring a task using a user interface authoring platform.

20 Claims, 15 Drawing Sheets

(51) Int. Cl.
*G06F 40/40* (2020.01)
*G06F 9/451* (2018.01)
*G06F 3/0482* (2013.01)
*G06F 3/0488* (2013.01)
*G06F 3/16* (2006.01)

(52) U.S. Cl.
CPC ............... *G06F 3/167* (2013.01); *G06F 8/34* (2013.01); *G06F 9/451* (2018.02); *G06F 40/40* (2020.01)

(56) References Cited

U.S. PATENT DOCUMENTS

2017/0235465 A1  8/2017  Marin et al.
2020/0135201 A1  4/2020  Crook et al.

OTHER PUBLICATIONS

"First Office Action and Search Report Issued in China Patent Application No. 201780004859.1", dated Dec. 9, 2020, 14 Pages.
"Office Action Issued in European Patent Application No. 17735748.0", dated Apr. 8, 2021, 14 Pages.
"Non Final Office Action Issued in U.S. Appl. No. 16/723,300", dated Mar. 10, 2021, 36 Pages.

\* cited by examiner

Edit Task

| Task Definition | Triggers | Parameters | Resolvers | Validation Conditions | Final Action |

+ Parameter 1 [Name]

- Name — 502
- Description — 504
- Type — 506
- Input Slot Tags — 508
- Resolver — 510
- Missing Value Dialog Act — 512
- Unique Value? ☐ — 516
- Disambiguation Dialog Act — 514
- Confirmation Required? ☐ — 518

+ Parameter 2 [Name]

Save

FIG. 5

NATURAL LANGUAGE TASK COMPLETION PLATFORM AUTHORING FOR THIRD PARTY EXPERIENCES

CROSS-REFERENCE TO RELATED APPLICATIONS

This application is a continuation of U.S. patent application Ser. No. 15/043,317, filed Feb. 12, 2016, issued as U.S. Pat. No. 10,635,281, which is hereby incorporated herein by reference in its entirety.

BACKGROUND

Conversational understanding systems allow users to vocally interact with a computing device to execute one or more tasks of interest to the user. Typically, such conversational understanding systems use one or more language understanding models to gather, based on the user's speech or conversation, a variety of information to identify the user's intent, and thereafter execute a task based on the identified intent. Tasks may include, for example, the execution of a query, execution of an application hosted on the user's computing device, booking of third party services, or display of information. Typically, third party application designers are responsible for designing their own language understanding models and multiple turn dialogue handling that interface with the conversational understanding system of the host computer on which their application resides in order to invoke their application in response to a user's spoken conversation. It is with respect to these and other general considerations that aspects have been made. Also, although relatively specific problems have been discussed, it should be understood that the aspects should not be limited to solving the specific problems identified in the background.

SUMMARY

In general terms, this disclosure is directed to a user interface platform that provides third party application experience designers with the ability to define executable tasks in terms of parameters and to select or author corresponding language understanding models that are useable in spoken dialogue systems. In particular, the present disclosure provides third party application experience designers a simplified and semi-automated approach to author tasks that can be executed using a spoken dialogue system. Accordingly, aspects of this disclosure provide a tool that provides application experience designers with the ability to define a task and to leverage pre-existing language understanding models and canonicalization and resolution modules for task understanding and execution using a user interface authoring platform.

In one aspect, the present disclosure is directed to a method for authoring a task using a user interface authoring platform, the method comprising: receiving, at the user interface authoring platform, a definition of a task; receiving, at the user interface authoring platform, a selection of an intent that will trigger the task; receiving, at the user interface authoring platform, a parameter that refines an execution of the task; and receiving, at the user interface authoring platform, an identification of a third party application used for execution of the task.

In another aspect, the present disclosure is directed to a system comprising: at least one processing unit; and at least one memory storing computer executable instructions that, when executed by the at least one processing unit, cause the system to perform a method, the method comprising: receiving, at a user interface authoring platform, a definition of a task; receiving, at the user interface authoring platform, a selection of an intent that will trigger the task; receiving, at the user interface authoring platform, a parameter that refines an execution of the task; and receiving, at the user interface authoring platform, an identification of a third party application used for execution of the task.

In yet another aspect, the present disclosure is directed to a computer-readable memory storage device, excluding a signal, which stores a set of instructions which when executed performs a method for authoring a task using a user interface authoring platform, the method comprising: receiving, at the user interface authoring platform, a definition of a task; receiving, at the user interface authoring platform, a selection of an intent that will trigger the task; receiving, at the user interface authoring platform, a parameter that refines an execution of the task; and receiving, at the user interface authoring platform, an identification of a third party application used for execution of the task.

BRIEF DESCRIPTION OF THE DRAWINGS

FIG. 5 illustrates an example screenshot of the user interface authoring platform for defining parameters.

DETAILED DESCRIPTION

Figure 1:
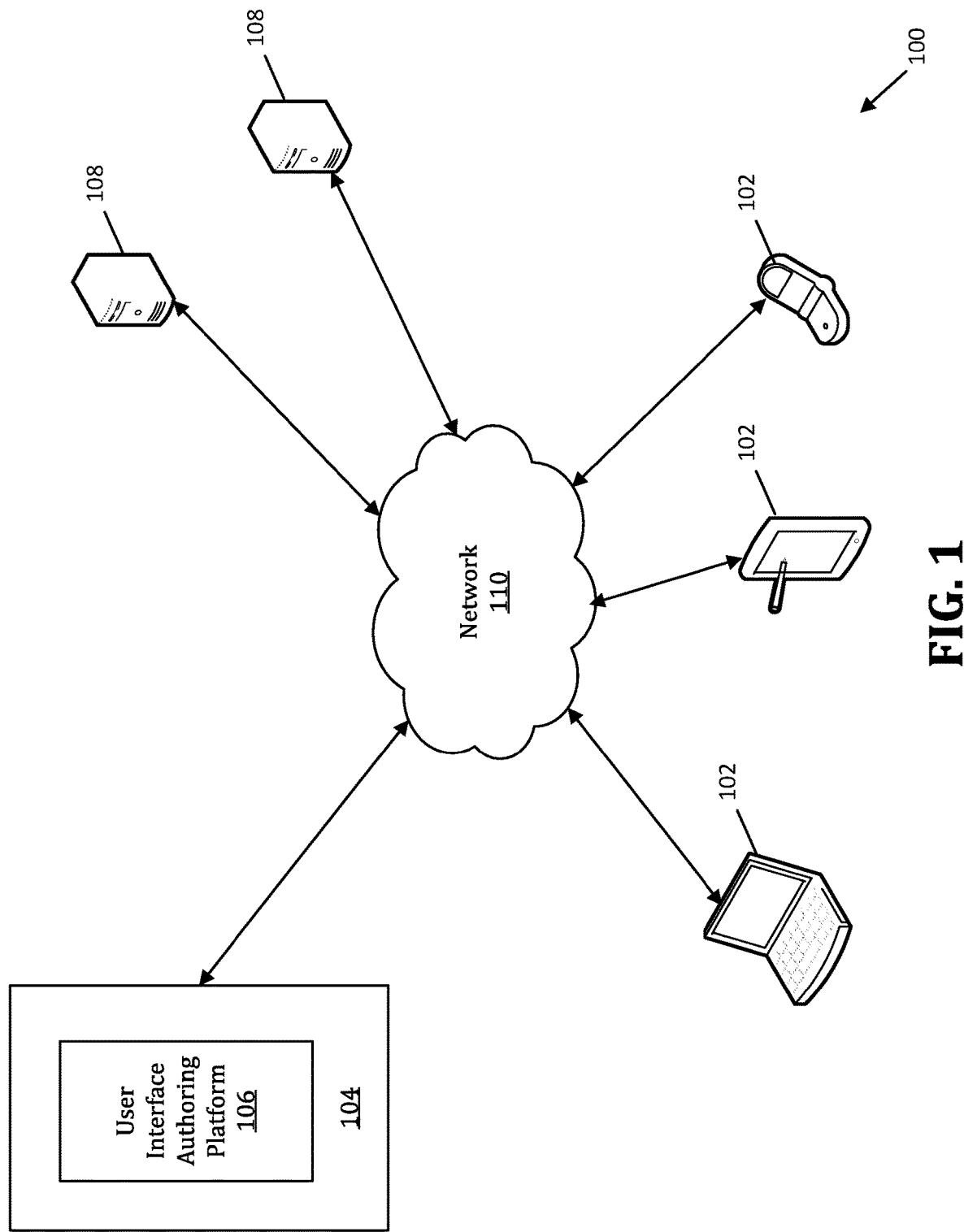
FIG. 1 illustrates a schematic block diagram of an example network useable for authoring third party experiences using a user interface platform.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Conversational understanding ("CU") systems assist users in performing various tasks by conducting a conversation with the user, using, for example, a spoken dialogue system, in which one or more question and answer turns may be involved. Conversational Understanding systems may be used to implement intelligent digital assistant applications, such as the CORTANA digital assistant application offered by Microsoft of Redmond, Wash. Conversational understanding systems use language understanding ("LU") models to identify spoken words and tag words of importance or relevance to a particular task. Tasks may be defined as the execution of a transactional action or providing information as requested by the user. Such tasks may be, for example, performance of an Internet query, display of results, execution of an application, procurement of third party services, etc. Tasks may be defined in terms of parameters, wherein parameters are containers that specify the entities that are collected and the semantic meaning of those entities within this task. Entities are representations of knowledge or understanding, for example a preference for "delivery" or "take-out" is an entity. Additionally, entities may be objects, such as a specific address or a restaurant. The task of reserving a taxi may require the fulfillment of parameters such as the start location, the time of pickup, and the number of passengers prior to execution of that task. As another example, the task of making a call using a phone application may require the fulfillment of parameters such as the name of the business or person to whom the call is directed or a phone number. As yet another example, the task of reserving a hotel may require the fulfillment of parameters such as the name of the city, the dates of the reservation, and an identification of the particular hotel. Tasks may further include optional parameters. For example, in the taxi example, optional parameters may be an identification of the destination location or the type of car desired; and in the hotel example, optional parameters may be the star rating of a hotel or proximity to a certain area of the selected city. Such optional parameters are not required for task execution, but may assist the application responsible for executing the task to further refine the desired task to be executed.

The conversation between the user and the CU system, which uses one or more LU models, is intended to obtain, from the user, the information that is necessary to fulfill those required parameters (and in some aspects, optional parameters) in order to execute the desired task. Still further, the CU system maintains a record of the information obtained during the conversation with the user as it relates to the defined parameters necessary (and in some aspects, optional) to execute the task. Additionally, CU systems may infer information that is outside the conversation, for example, inferring the user's location or language requirements. In some aspects, the CU system may provide, to the user, the obtained information as a way of verifying the accuracy of the obtained information. For example, the CU system may display the obtained information to the user or may verbally identify the obtained information providing the user with a confirmation of the CU system's understanding of the task execution and the corresponding parameters obtained. In aspects, CU systems may revise information obtained during the user conversation to address speech recognition or comprehension errors, language understanding errors, parameter resolution errors, or as requested by a user.

Additionally, the CU system may ask, via a voice or a text prompt, the user to provide further information that is necessary for task execution. For example, the CU system may have pre-defined or auto-generated prompts that elicit, from the user, further information or clarification to fulfill the required parameters necessary for task execution.

Still further, during the conversation, the CU system may provide the user with matching or suggested valid options from which to select for fulfillment of parameters prior to execution of the task. The CU system may provide, to the user, the information obtained during the conversation by, for example, displaying the gathered information on a display of the device or by, for example, reading aloud the gathered information. The CU system may further ask the user to confirm the accuracy of the provided information as a final step prior to task execution. At this point in the conversation, the user may, for example, confirm or edit the information or cancel execution of the task altogether. In an example, the user may confirm or edit the information by voice or gesture such as typing, touch, or movement of the device. Based on a confirmation response received from the user, the CU system may execute the identified task. Based on an edit information response received from the user, the CU system may repeat the conversation or seek selected information to be edited. Based on a cancellation response received from the user, the CU system may terminate the conversation and task execution process entirely.

Aspects disclosed herein provide a user interface authoring platform that automates and simplifies the task definition process while also providing the ability to leverage pre-existing language understanding models and canonicalization and resolution modules that are provided by the operating system or a cloud-based service on which the CU system resides or as provided by other third parties. The systems and methods disclosed herein provide a tool that can be used to create an interface between the third party application and the CU system. Although reference is made to a third party application and third party application authors, the novel aspects provided herein may extend to any application or application author. Furthermore, because CU systems are complex and hard to design, the systems and methods disclosed herein provide the ability for third party applications to make use of existing CU systems and models. Third party application authors can therefore use the user interface authoring platform to efficiently and more simply define tasks and leverage pre-existing language understanding models to identify those defined tasks.

FIG. 1 illustrates a schematic block diagram of an example network 100 useable for authoring third party experiences using a user interface platform. The network 100 includes one or more third party computing devices 102, a server 104 hosting a user interface authoring platform 106, and a database 108 storing, among others, language understanding models and canonicalization and resolution modules. In this example aspect, the third party computing devices 102, the server 104, and the database 108 are connected via a data communication network 110, such as the Internet.

Aspects described herein are directed to providing a user interface authoring platform 106. The user interface authoring platform 106 is a tool used to automate and simplify the task authoring process. In some aspects, the user interface authoring platform 106 operates remotely on the server, accessible by one or more third party client devices 102 via the data communication network 110. In other aspects, the user interface authoring platform 106 operates locally on the one or more third party client devices 102.

As will be described in further detail herein, the user interface authoring platform 106 is an authoring tool designed to provide third party application authors with the ability to specify tasks and select or author one or more language understanding models useable by the CU system to identify and execute the specified task. In particular, the user interface authoring platform 106 guides third party application authors to define a task in terms of the one or more required and even optional parameters necessary to complete the task. The user interface authoring platform 106 further provides the optional ability of an author to specify validation conditions, which define the one or more valid conditions that must exist among one or more parameters for task execution. Additionally, the user interface authoring platform 106 allows a third party application author to select, from the database 108, one or more language understanding ("LU") models that extract, from a user's speech or conversation, the information required to identify the appropriate task and to identify corresponding parameters. The LU models are used to annotate or analyze spoken or text input and may be directed to a specified domain. For example, an LU model may be specific to identifying utterances (e.g., speech or text input) relating to the task of booking restaurant reservations in a restaurant domain. Such an LU model may be used to identify words or phrases to determine a user's intent as it relates to the particular domain and may also be used to fill the parameters of the task. For example, a particular LU model may be used for the task of booking restaurant reservations. Such an LU model could be applied to the spoken phrase "Is there availability for four people at Andy's Mexican Restaurant tonight at 6:30?" to identify the task of making a restaurant reservation and to identify parameters such as the particular restaurant at which reservations are desired [Andy's Mexican Restaurant], the number of people [four], and the time [6:30 PM] which may be required in order to execute the task. It is understood that a single task may create several intents, which is described in further detail herein.

The user interface authoring platform 106 provides the third party application author with the ability to select one or more preexisting LU models. To the extent that an LU model does not already exist in the database 108, the user interface authoring platform 106 provides the third party application author with the ability to create one or more new LU models. The user interface authoring platform 106 further allows the third party application author to select, from the database 108, one or more canonicalization or resolution modules that transform user input into a standardized format. To the extent that a canonicalization or resolution module does not already exist in the database 108, the user interface authoring platform 108 allows the third party application author to create such modules. Each of these aspects will be described in further detail herein.

Client device 102 may be any computing device, such as, for example, a cell phone, a personal digital assistant, a laptop, a desktop, or a tablet PC. The client device 102 hosts the intelligent digital assistant application, as described herein. Still further, the client device 102 stores one or more applications that can be executed thereon using the intelligent digital assistant application. Such applications may refer to, for example, applications that are provided with the device such as a phone application, an Internet browser application, an email application, a weather application, a note taking application, a text messaging application, a calendar application, a camera application, a map application, etc. Other third party applications may also be installed on the client device 102, such as, for example, a taxi cab reservation application, a hotel reservation application, a social media application, a gaming application, etc. Accordingly, a third party application author may, using the user interface authoring platform 106, create one or more tasks that execute a particular third party application installed on the client device 102.

Figure 2:
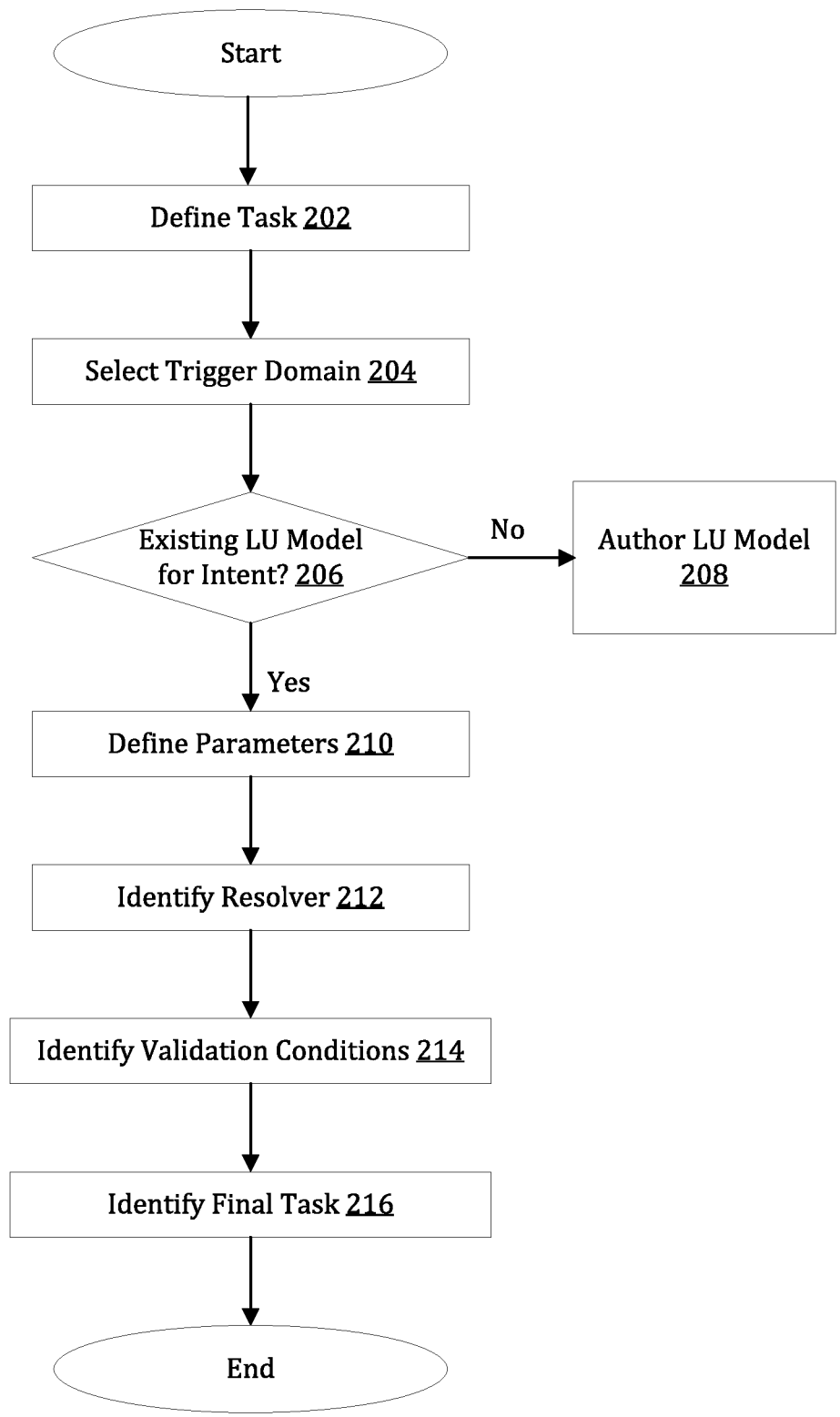
FIG. 2 illustrates an example method for specifying a task using the user interface authoring platform.

FIG. 2 illustrates an example method 200 for specifying a task using the user interface authoring platform 106. As described herein, the user interface authoring platform 106 allows a third party application designer to, among other features, specify tasks and corresponding parameters as well as select appropriate LU models used to analyze and extract speech to determine a user's intent as it relates to the defined task. Specification of a task includes identifying whether the value of each parameter is to be provided by the user or inferred by the CU system, specifying how to request information from the user if additional input is required, identifying whether tagged input is sufficient to include information to satisfy the one or more defined parameters, and combining the tagged user input as user input with other parameters that have been collected in order to canonicalize and resolve the entity representing that particular parameter. In the taxi ordering task example, a resolver may combine a previously-collected parameter representing the user's location together with tagged user input representing the type of taxi desired by the user to determine whether the type of taxi requested by the user is available. If such a taxi type is available, the resolver may provide a product identification. If, alternatively, no such taxi type is available, the resolver may provide an error message indicating that the particular type of cab requested is not available in that location. In another example, such as a phone calling experience, the system may use a previously-collected parameter indicating which contact to call, together with tagged user input representing the phone number type (for example, work, home, or cellular) in order to identify the actual phone number to dial.

It is understood that the user interface authoring platform 106 may be used to guide an author to create tasks, select LU models, intents, parameters, resolvers, validation conditions, etc. The user interface authoring platform 106 may guide the author throughout the authoring process by providing the author with suggestions, either in response to a selection provided by the author or in response to an understanding of the author's goal in view of the task. For example, the author may input a query and the user interface authoring platform 106 may, in response, provide suggestions for possible intents, slot tags, parameters, resolvers, validation conditions, etc.

Furthermore, although illustrations and examples provided herein describe a particular implementation using the platform 106, novel aspects of the present disclosure may also be implemented using an Integrated Development Environment (IDE) such as, for example, Visual Studio offered by Microsoft of Redmond, Wash. Such an implementation using an IDE allows authors to provide task specifications using a text-like developer tool that is not web-portal based. Such an IDE may also provide support for discovery, auto-completion, suggestions, and syntax correction of task definition files. An example IDE is shown and described with reference to FIG. 10.

In the task definition operation 202, the user interface authoring platform 106 prompts the third party application author (hereinafter "author") to define a task. In particular, defining a task may involve one or more of identifying the task name and an associated description. In an example, the user interface authoring platform 106 may present a dialog box prompting the author to identify the name of a task that the particular application executes. For example, a task may be identified as "BookTaxi" for a taxi service application. In other examples, the task may be defined as "FindScores" for a sports application. The task definition operation 202 may also prompt the author to add a description of the task to be executed by the CU system. In the example above, the "BookTaxi" task name may be associated with a description such as, for example, "Task to enable booking a taxi using Cortana." In the task definition operation 202, the user interface authoring platform 106 also prompts the author to select at least one LU domain or category associated with the task. Language understanding models may be organized by their relevant domain. Accordingly, a selection of a LU domain filters down the relevant LU models that can be selected by the author, from among a plurality of potentially relevant LU models stored in the database 108. In the "BookTaxi" example, a selected domain may be "taxi" or "transportation" and for the "FindScores" example, a selected domain may be "sports." Accordingly, the identification of the domain may narrow down the choice of LU models from which the author may select. These domains may be selected from one or more available domains and as saved in the database 108. It is understood that tasks may have one or more LU models associated therewith. Accordingly, more than one LU model may be selected by the author. Each LU model may be independent from one another. For example, in the BookTaxi task example, one selected LU model may be a transportation LU model and another selected LU model may be a time and date LU model. An example of the task definition operation 202 is further illustrated and described with reference to FIG. 3.

In the select trigger domain operation 204, the author may select, from the database 108, one or more additional trigger domains associated with the identified task. Generally, a trigger domain is considered to be a collection of trigger intents that include the slot tags for tagging the information necessary to execute the task. In an example, an "alarm" trigger domain may comprise trigger intents of various actions that could be taken such as, for example, "add_alarm," "modify_alarm," "query alarm," and "delete_alarm" wherein the corresponding slot tags to fulfill those trigger intents might be, for example, "alarm_name," "alarm time," etc. Accordingly, it is understood that in operation 202, the LU domain selected has associated therewith one or more trigger intents and corresponding slot tags. If the selected domain in operation 202 does not include all the intents necessary to execute the task, an author, in operation 204, may select one or more additional trigger domains that include one or more additional trigger intents for task execution. Accordingly, the user interface authoring platform 106 may prompt the author to select another trigger domain that is used to trigger execution of the task. Based on the selected trigger domain and the associated LU model, the user interface authoring platform 106 may prompt the author to select one of the populated trigger intents associated with the selected trigger domain. In the taxi reservation example, an additional domain such as "restaurant" may be selected, and the user interface authoring platform 106 may populate one or more intent associated with the selected restaurant domain, including, among other intents, an "add tip" intent and a corresponding slot tag such as "tip_amount." Accordingly, an author may use one or more pre-existing domains to author a task. Additionally or alternatively, the author may, using the user interface authoring platform 106, create a new intent and build an LU model specific to the newly created intent. The author may therefore create a new domain entirely or augment the selected domain.

Each selected intent may be associated with one or more LU models that include commonly used phrases or words associated with executing the task Continuing with the taxi example, the LU model may be pre-selected based on the intent or the author may select corresponding LU models. In an example, for a "book taxi" intent, the author may use the LU model associated therewith or the author may select another LU model such as, for example, a Book Taxi LU model. The Book Taxi LU model may be particularly directed to identifying speech (including words and phrases) associated with the intent of booking a taxi. Alternatively, if the desired LU model is unavailable, the author may create a new LU model corresponding to the particular task. It is understood that more than one intents and more than one models may be selected to trigger the task.

Alternatively or additionally, the author may, using the user interface authoring platform 106, whitelist, or hard code certain queries or phrases that trigger the defined task. Thus, if the CU system receives an exact spoken query, the task will be triggered and selected LU models may be used to assist the CU system in executing the task. An example of the select domain trigger operation 204 is further illustrated and described with reference to FIG. 4.

In the LU model coverage decision 206, the user interface authoring platform 106 may ask the author whether the existing LU model(s) stored in database 108 are sufficient to trigger execution of the task. If the stored LU models are insufficient to trigger execution of the task flow proceeds to operation 208 in which the author may add one or more LU models not previously stored in the database 108. In some examples, the author may create such LU models to trigger execution of the defined task. In some examples, the author may also save the created model in the database 108.

Alternatively, if at the LU model coverage decision 206 it is determined that the stored LU models are sufficient to trigger execution of the defined task, flow proceeds to the define parameters operation 210. The define parameters operation 210 is further illustrated and described with reference to FIG. 5. In the define parameters operation 210, parameters are identified and defined. As described herein, tasks may be described by one or more parameters that are fulfilled prior to task execution. Parameters specify the task and the pieces of information that need to be collected by the CU system before the task is executed. Parameters relate to, and provide information for, the task defined in operation 202. A parameter may correspond to information that must be collected or processed by the CU system before the task can be executed. For example, a parameter may correspond to information such as the start location of the "BookTaxi" task. Parameters may be grouped into required parameters or optional parameters, wherein the required parameters are pieces of information that must be collected for the task to be executed, and optional parameters are those that further refine the task, but are not necessary for task execution or whose default or inferred values are sufficient to execute the task. In addition, whether a parameter is optional or required may be expressed in terms of an expression over the state or value of other parameter values that are evaluated at runtime. The value of each parameter is either collected by the CU system or it is inferred by the system. For example, if a parameter requires the person's location, the person may either provide that information or the CU system may use the device's GPS system to determine the person's location. Alternatively or additionally, if time is a parameter, the person may provide the time to the CU system or the system may infer that if no time is specified, the current time or some other time is used.

In the define parameters operation 210, for each parameter, the user interface authoring platform 106 may populate the name of the parameter, the parameter type, and the one or more slot tags associated with the particular parameter (e.g., for the "BookTaxi" task, slot tags may be, for example, "origin_location" and "end_location"), In one example implementation, an author may be required to provide or select the name of the parameter, a description of the parameter, a parameter type, one or more parameter slot tags, an appropriate resolver for the parameter, a selection indicating whether the parameter is a unique value, and a selection indicating whether the parameter requires user confirmation. Additionally, one or more dialog acts may be used to define how the system obtains information for each parameter. In some embodiments, a dialog act may be defined as a prompt that is displayed or otherwise provided to a user and in other embodiments, a dialog act is defined differently. A dialog act may thus be defined as a prompt and/or a user experience/user interface, as shown with reference to FIG. 9. Referring back to FIG. 2, in the define parameters operation, information gathering dialog acts may be, for example, a missing value dialog act, a disambiguation dialog act, a no results dialog act, a suggestions dialog act, a selection dialog act for prompting the user to select from among a small list of possible values, and a confirmation dialog act prompting the user to confirm the value of the parameter. The one or more dialog acts may be used to define the user interface implementation for obtaining such information related to each parameter from the user. In particular, the author may define one or more user interfaces that may be provided to a user to simply display information to the user or to obtain information for task execution. In the "BookTaxi" task example, a dialog act may be used to define a map user interface that could be displayed on the user's device showing the pick-up location in response to receiving information relating to the "destination location" parameter. Still further, in the "BookTaxi" task example, another dialog act may be used to define an interactive map or a selectable list of nearby or potential locations on the user's device in response to receiving a pick-up location that could not be found or determined by the system. An example user interface illustrating how an author may edit a dialog act is shown and described with reference to FIG. 9.

Referring back to the define parameters operation 210, the parameter description may be a text string that provides further detail about the parameter. For example, in the taxi example, for the parameter name "end_location" the associated description may be "The destination location of the trip."

The parameter type may categorize the parameter. For example, the parameter type for the "end_location" parameter may be of type "Place." The type may be a predefined type that is understood by the CU system. Accordingly, by setting the type as "Place" the CU system may understand that the end_location parameter corresponds to latitude/ longitudinal coordinates. It is understood that the parameter type may be either defined or selected from a list of parameter types by the author.

The one or more slot tags are used as inputs to resolve the parameter. In this example, the slot tags "absolute_location", "place_type", and "place_name" may be selected, each of which correspond to a particular type of location information tagged in user input utterances. For example, "One Microsoft Way" may be tagged as an "absolute_location," whereas "the Space Needle" may be tagged as a "place_ name." Collectively, the set of slot values corresponding to the instances of "absolute_location", "place_type" and "place_name" will be used to resolve the user input into one or more place entities, which would form the possible values of the parameter end_location.

The selected resolver for each parameter may be used to inform the CU system how to resolve or understand a detected keyword. In this example, a "PlaceResolver" may be selected, which informs the system that the provided parameter is associated with latitude and longitudinal coordinates. In the "BookTaxi" task example, for a car preference parameter, the CU system extracts, from the natural language query, the user's car preference. Based on the provided resolver, the CU system determines or resolves the car preference into a car identification. In some examples, it is understood that the resolver may be authored by the experience author.

A missing value dialog act may be defined by the author that instructs the CU system to request, from the user, the parameter value if the value is not obtained from the query. For example, the missing value dialog act may be a prompt string such as, "Where would you like to go?" for the "end_location" parameter. The dialog act may also be used to specify the associated user experience, such as displaying, on the display of the device, the prompt string, or verbally providing the prompt to the user. The author may also use a dialog act to select or define a user interface to be displayed to the user and used to obtain such parameter information. In the "end_location" parameter example, the author may select a map user interface to display a selectable map that allows the user to simply select the destination location rather than providing it verbally or typing it in. In another example such as a "BookRestaurant" task having a "reservation time" parameter, the author may select a user interface to display a selectable list of appropriate times from which the user may choose as the reservation time.

A disambiguation dialog act may be defined by the author that instructs the CU system to ask the user to verify a particular value of a parameter in order to resolve ambiguities that may arise because the CU system obtained multiple potential values for a parameter For example, in response to extracting two different locations from the natural language query, the CU system may display a listing of the obtained values alongside a prompt such as "Please select your destination location.". In other examples, the CU system may simply prompt the user to re-state the destination location without providing a selection. The author may also define a user interface dialog act that is displayed or otherwise provided to the user in response to receiving conflicting pieces of information. In an example, the author may define dialog act that displays, on the user's device, a listing of the conflicting pieces of information and requesting the user to select the correct information, or, if none of the displayed information is appropriate, requesting the user to manually or verbally provide the information.

The no results dialog act may be defined by the author that instructs the CU system to indicate that no results were returned. For example, using the user interface authoring platform 106, the author may use a dialog act to select or define a user interface that indicates no results were returned.

The suggestions dialog act may be defined by the author that instructs the CU system to provide the user with one or more suggestions in response to returning no results. For example, an author may use the dialog act to define a prompt such as "Please select a location" and an associated user interface including a list of the suggested locations or a map displaying the suggested locations.

In the identify resolvers operation 212, for each parameter, the user interface authoring platform 106 specifically identifies the resolver selected in the identify parameters operation 210. For example, the identify resolvers operation 212 may comprise identifying the name and relative path of the library in which the selected resolver resides as well as identification of the function name within the resolver library.

The author may also define a failure dialog act that provides a failure prompt to the user in the event that the parameter cannot be resolved. In an example, for a location-based parameter, the author may define a dialog act that provides a text string that recites, "I'm sorry, I cannot resolve the location right now." The identify resolvers operation 212 is further illustrated and described with reference to FIG. 6.

In the identify validation conditions operation 214, the user interface authoring platform 106 allows the author to define conditions that must be satisfied prior to task completion and what the system should do if one or more of those conditions are breached. In an example, when booking a taxi, a validation condition would ensure that the start and end location may be reachable using only ground transportation. In another example, for an email sending task, a validation condition would ensure that the subject and body of the email are not both empty before sending the email. The identify validation conditions operation 214 is further illustrated with reference to FIG. 7.

In the final task identification operation 216, a final action or task may be defined. In an example, the final task identification operation 216 may prompt the author to provide a name for the final action as well as a listing of each of the required and optional input parameters that need to be provided for task execution. The final task identification operation 216 may further prompt the user to provide the resolver associated with the final action. The final action resolver is responsible for providing the final piece of information to be displayed to the user, or performing an action on behalf of the user. For example, in the taxi example, the final action resolver is responsible for placing an order for a taxi based on the received information. The final action resolver may further include, in an example, also returning a confirmation code that can be displayed to the user. In the final task identification operation 216, the author may define a confirmation dialog act that prompts the user to confirm the task execution prior to task execution. In the taxi example, a confirmation dialog act comprising a prompt such as "Would you like me to book this trip now?" may be defined by the author. Alternatively, in the final task identification operation 216, the author may define a confirmation failure dialog act that prompts the user to confirm the non-execution of a task. A task may not be executed based on user interaction with the system or based on the lapsing of a predetermined period of time. In the taxi example, a confirmation failure dialog act such as, "I will not book this trip. What would you like to change?" may be defined and provided to the user. In the final task identification operation 216, the author may define a completion dialog act that specifies a completion prompt to be displayed or otherwise provided to the user in the event that the task is executed. In the taxi example, a completion prompt such as, "Your taxi has been booked. Your booking ID is <ID>" may be provided to the user.

Accordingly, the method 200 provides a third party application author with the ability to define one or more tasks that may be executed using the CU system of the device as well as the ability to author one or more dialog acts. In defining the task, the method 200 allows the third party application author to leverage third party LU models to extract keywords from a natural language query in fulfilling the necessary and optional parameters associated with the task as well as leverage one or more third party resolvers used by the CU system to understand the detected keywords in order to complete the task.

Figure 3:
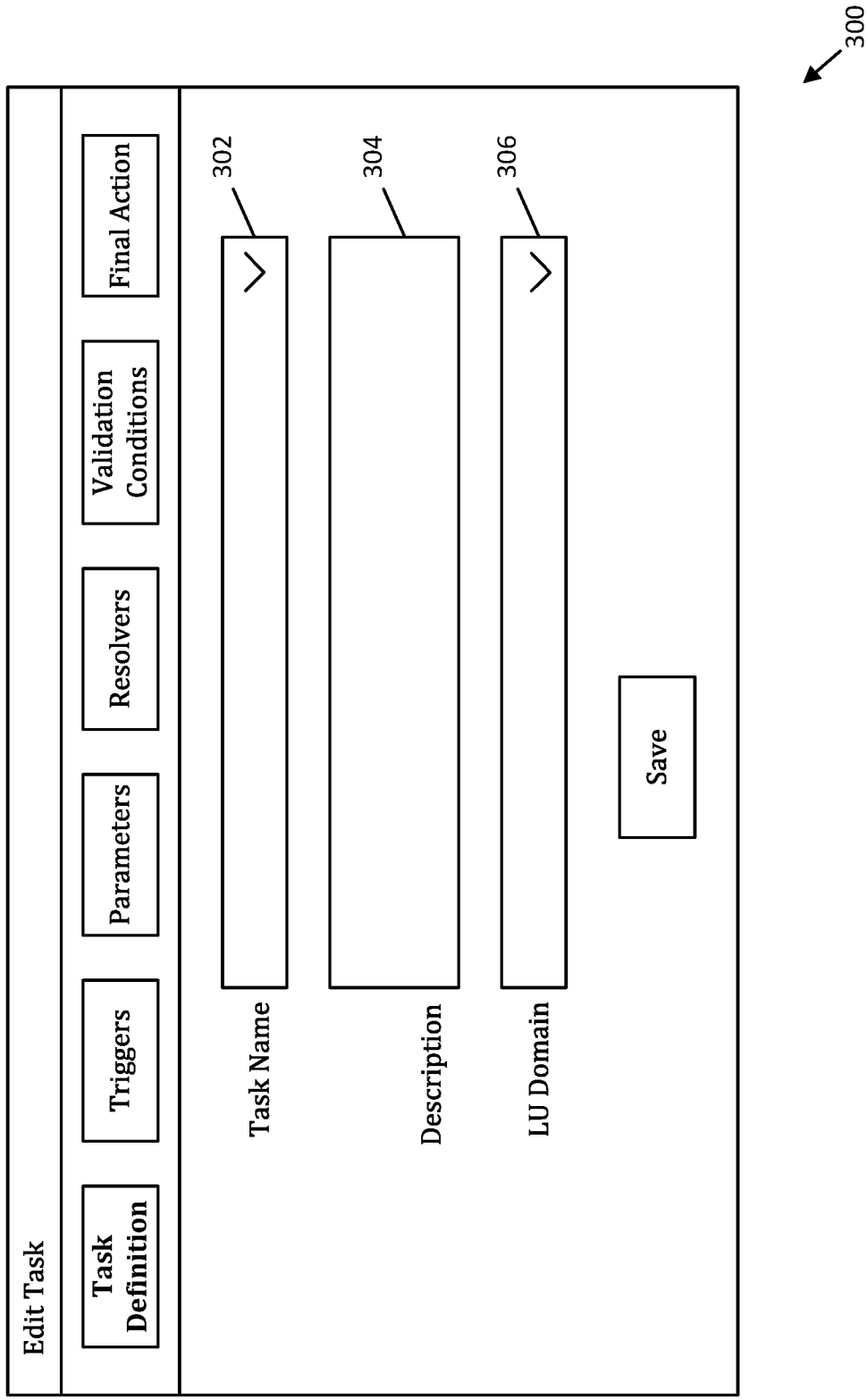
FIG. 3 illustrates an example user interface authoring platform for defining a task.

FIG. 3 illustrates an example screenshot 300 of the user interface authoring platform for defining a task as described with reference to the task definition operation 202 of FIG. 2. As illustrated in the example screenshot 300, the user interface authoring platform 106 includes a text box 302 for providing the task name and a text box 304 for providing a description of the task. The user interface authoring platform 106 further provides a drop-down menu 306 having a list of LU models from which the author may select. In other embodiments, the LU models may be provided, rather than selected, by the user.

Figure 4:
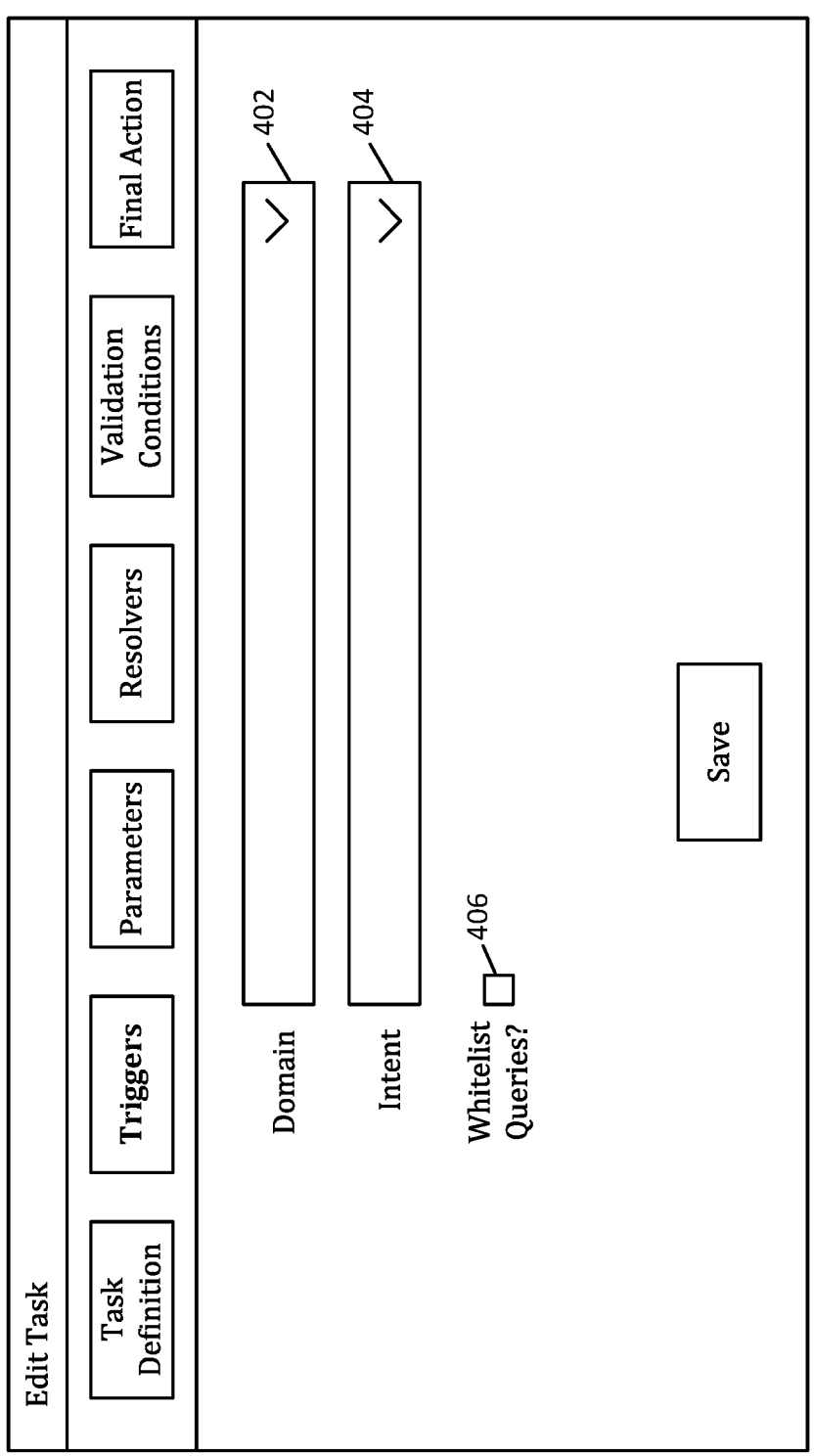
FIG. 4 illustrates an example user interface authoring platform for identifying one or more intents that will trigger the task.

FIG. 4 illustrates an example user interface authoring platform for selecting one or more trigger domains and identifying one or more related intents as described with reference to the select trigger domain operation 204 of FIG. 2. As illustrated in the example screenshot 400, if additional domains and intents are required, the user interface authoring platform 106 includes, in an example, a drop-down menu 402 for selecting additional domains used to trigger the particular task. Based on the selected additional domain in menu 402, one or more corresponding intents may be automatically populated in intent drop-down menu 404 from which an author may select. As described herein, the selected intent will be the basis for the model that will be used to trigger execution of the task. The example screenshot 400 further includes a selection box 406 identifying whether the author would like to whitelist or hard code trigger queries. If selected, the selection box 406 would reveal an additional input text box for the experience author to provide a list of trigger queries (not shown).

FIG. 5 illustrates an example screenshot of the user interface authoring platform 106 for defining parameters as described with reference to the define parameters operation 210 of FIG. 2. As illustrated in the example screenshot 500, the user interface authoring platform 106 may include menu 502 that identifies the name of the parameter as well as menu 504 for identifying a description of the parameter. It is understood that menus 502 and 504 may be pre-populated based on the selected user intent that is associated with the parameter. The user interface authoring platform 106 may also include a menu 506 for identifying a type to categorize the parameter. It is understood that menu 506 may be a drop down menu from which an author may select the appropriate parameter type. Still further, the user interface authoring platform 106 may include menu 508 to provide or select one or more slot tags that map to the particular parameter. The user interface authoring platform 106 may include menu 510 for providing or selecting a resolver for the selected parameter.

The user interface authoring platform 106 may also include menu 512 for defining dialog act that instructs the CU system to request, from the user, a parameter value if it is not obtained from the query (e.g., a missing value dialog act). In some embodiments, the menu 512 is a drop-down menu including one or more prompt strings from which an author may select. In other embodiments, the author may provide the prompt string. And yet in other embodiments, other dialog acts are provided, such as the corresponding user experience/interface. The selection may also be displayed to the author, allowing the author to view each selected prompt from menu 512.

Still further, the user interface authoring platform 106 may include menu 514 for defining a dialog act that instructs the CU system to ask the user to verify a particular value of a parameter in order to resolve ambiguities that may arise because the CU system obtained multiple potential values for a parameter (e.g., a disambiguation dialog act). Similar to menu 512, menu 514 may be, in some embodiments, a drop-down menu including one or more disambiguation prompts from which an author may select or the author may provide the prompt and corresponding user experience/interface. The selection may also be displayed to the author.

The user interface authoring platform 106 may also include a selection box 516 indicating whether the parameter is a unique value and a selection box 518 indicating whether the parameter requires user confirmation.

It is understood that FIG. 5 is merely exemplary and that the various menus 502-514 may each be drop-down menus of possible dialog acts from which the author may select. There may also be an associated selection button such as an "Add" button allowing the author to add the selected dialog act from one of the menus 502-514. In such an example, once a selected dialog act is added, that dialog act may be shown in the display, allowing the author to view each selected dialog act. There may also be additional functionality allowing the author to define one or more associated user interfaces, as described herein with reference to the define parameters operation 210. It is therefore understood that FIG. 5 is merely exemplary and is not intended to limit the present disclosure to the illustrated configuration.

Figure 6:
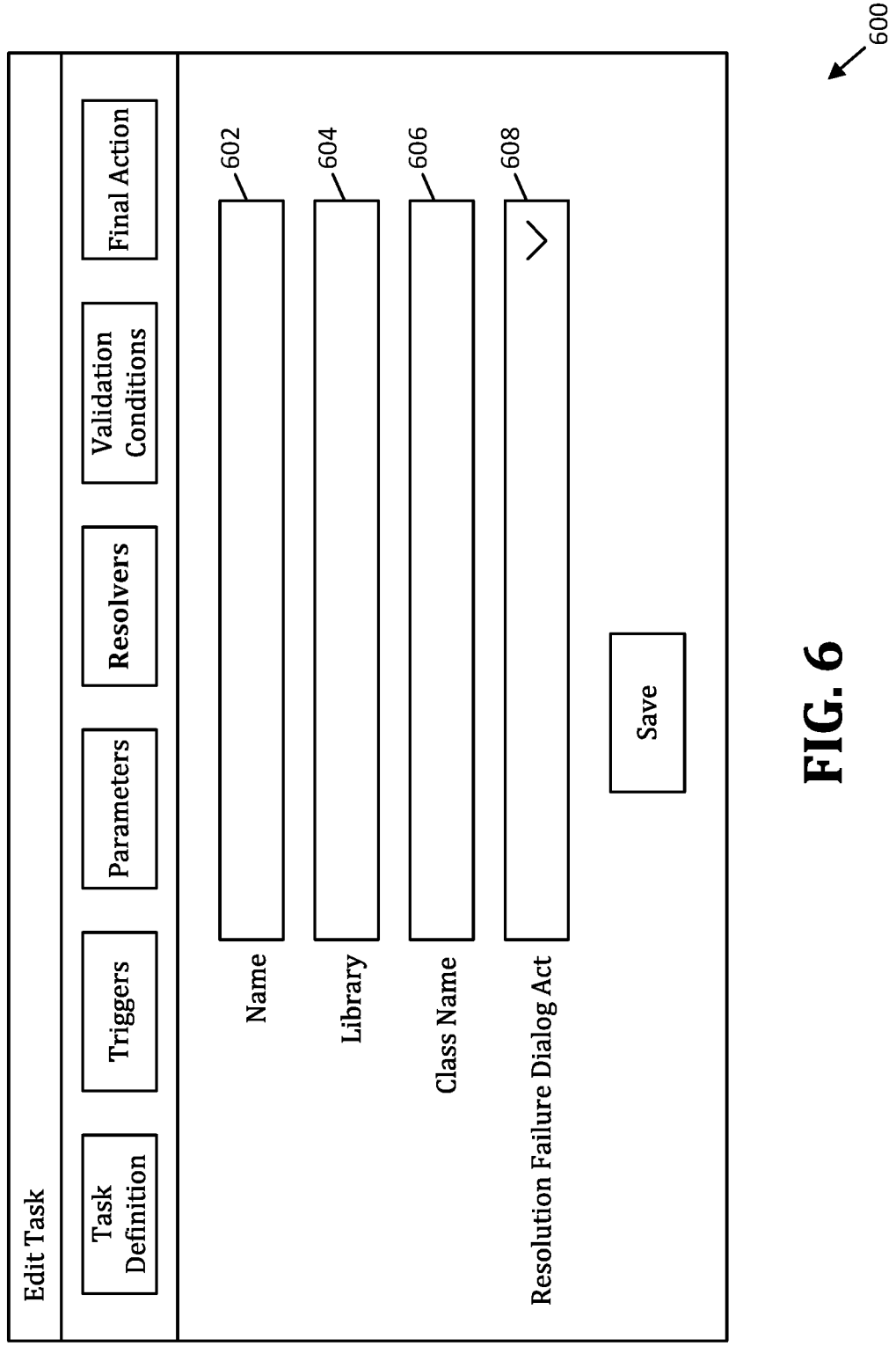
FIG. 6 illustrates an example user interface authoring platform for identifying resolvers.

FIG. 6 illustrates an example screenshot of the user interface authoring platform for identifying resolvers as described with reference to the identify resolvers operation 212 of FIG. 2. As illustrated in the example screenshot 600, the user interface authoring platform 106 includes a menu 602 for providing or selecting one or more resolvers and a menu 604 for providing the directory path of the library in which the selected resolver resides. The user interface authoring platform 106 may also include a menu 606 for providing the specific function name or the class name within the identified resolver library. Still further, the user interface authoring platform 106 may include menu 608 for defining a dialog act that may be, for example, a resolution failure prompt dialog act that indicates whether a parameter cannot be resolved. In some embodiments, the menu 608 is a drop-down menu including one or more failure prompt strings from which an author may select. In a further example, once selected, the failure prompt string may be displayed to the author, allowing the author to view each selected failure prompt string from menu 608 and a corresponding user experience/interface.

It is understood that FIG. 6 is merely exemplary and that various menus 602-608 may each be drop-down menus of possible dialog acts from which the author may select. There may also be an associated selection button such as an "Add" button allowing the author to add the selected dialog act from one of the menus 602-608. In such an example, once a selected dialog act is added, that dialog act may be shown in the display, allowing the author to view each selected dialog act. There may also be additional functionality allowing the author to define one or more associated user interfaces, as described herein with reference to the identify resolvers operation 212. It is therefore understood that FIG. 6 is merely exemplary and is not intended to limit the present disclosure to the illustrated configuration.

Figure 7:
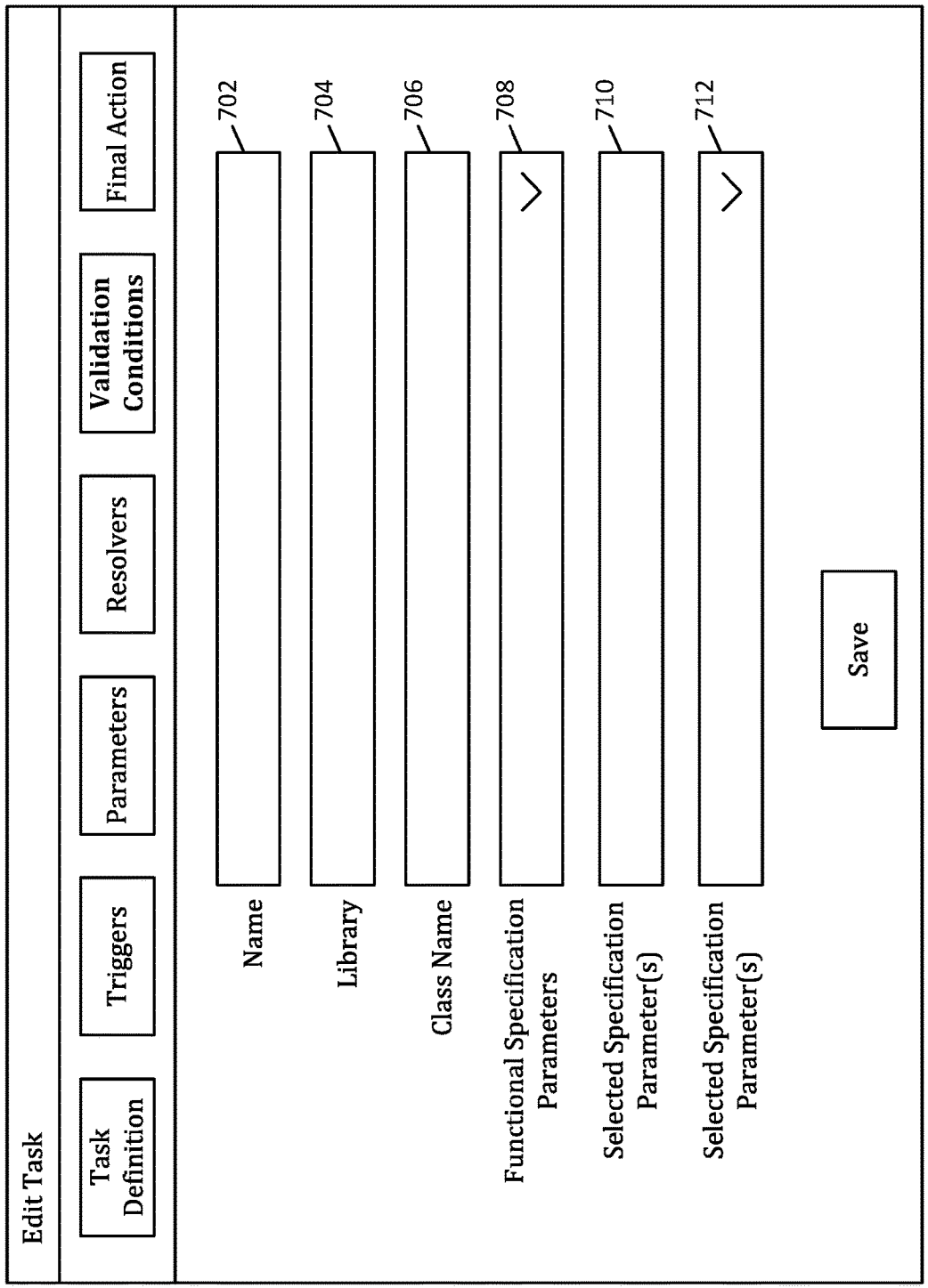
FIG. 7 illustrates an example user interface authoring platform for identifying validation conditions.

FIG. 7 illustrates an example screenshot 700 of the user interface authoring platform 106 for identifying validation conditions as described with reference to the identify validation conditions operation 214 of FIG. 2. As described herein, the user interface authoring platform 106 further provides the ability to specify validation conditions, which define the one or more valid conditions that must exist among one or more parameters for task execution. As illustrated in the example screenshot 700, the user interface authoring platform 106 includes a menu 702 for specifying the name of the condition and a corresponding menu 704 for providing the directory path of the library in which the selected validation condition resides. The user interface authoring platform 107 may also include a menu 706 for providing the specific function name or the class name within the identified validation conditions library. In an example, once the value in menu 706 for providing the specific name is provided, a dropdown 708 and text box 710 may appear. For example, a drop-down menu 708 may contain additional functional specification parameters required to be provided in order to fully implement the function. Selecting each parameter from menu 708 may produce the value corresponding to that parameter in text box 710, allowing the author to edit or otherwise modify the value or provide a new one if not provided. Additionally, menu 712 may list all the parameters of the task as specified in FIG. 5. The author can select one or more parameters of the task from drop-down menu 712 to use as input parameters to the validation function.

Figure 8:
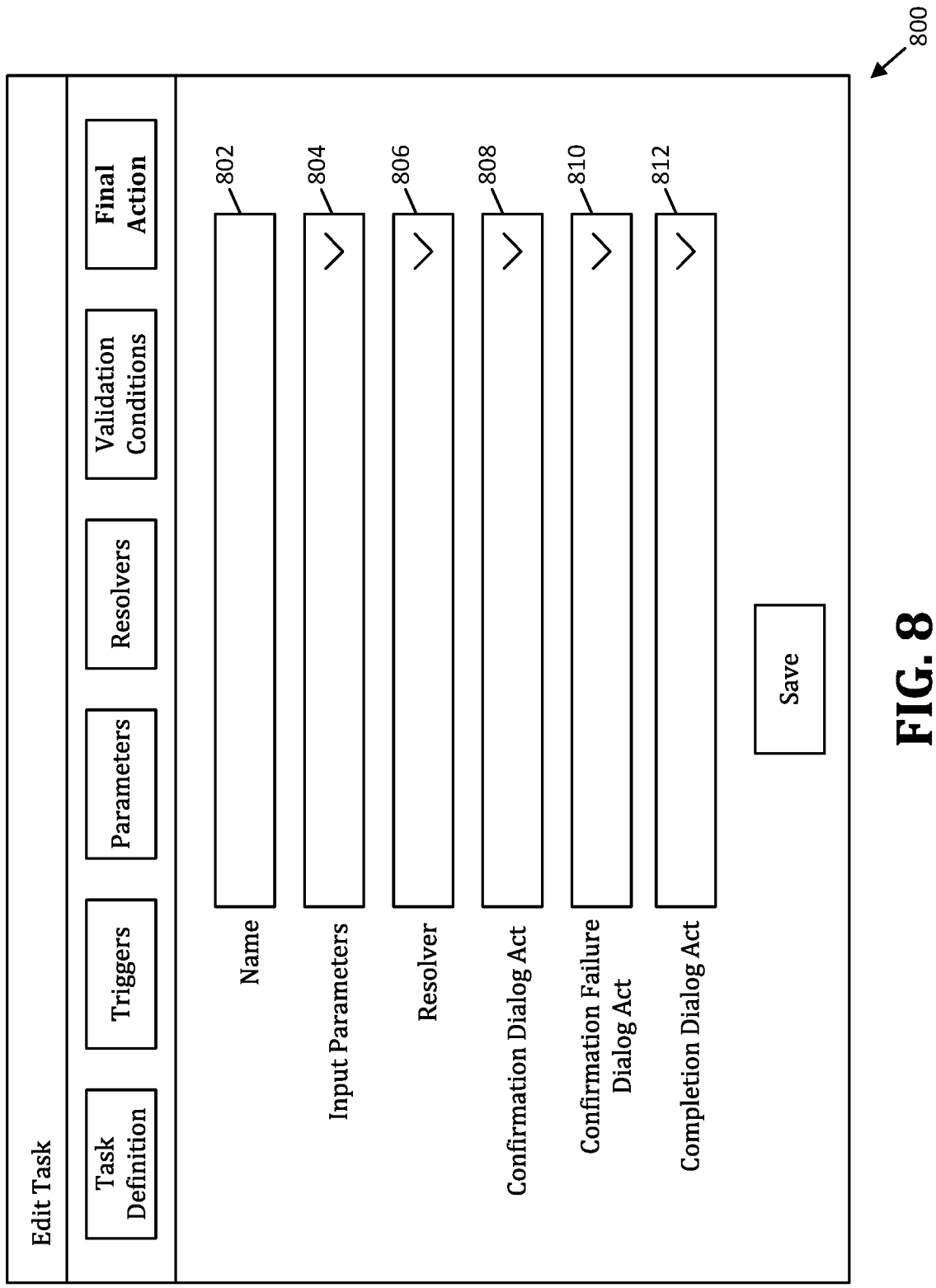
FIG. 8 illustrates an example user interface authoring platform for defining the final action.

FIG. 8 illustrates an example screenshot of the user interface authoring platform for defining the final action as described with reference to the final task identification operation 216 of FIG. 2. As illustrated in the example screenshot 800, the user interface authoring platform 106 includes a text box 802 for providing the name of the final action as well as a text box 804 for providing a list of the required and optional input parameters for task execution. The user interface authoring platform 106 may further include a text box 806 for providing a resolver associated with the final action. The user interface authoring platform 106 may further include a menu 808 for defining a confirmation dialog act to be provided to the user prior to task execution. The user interface authoring platform 106 may further include a menu 810 for defining a confirmation failure dialog actin the event that the task is not executed. The user interface authoring platform 106 may further include a menu 812 for defining a completion dialog act.

Figure 9:
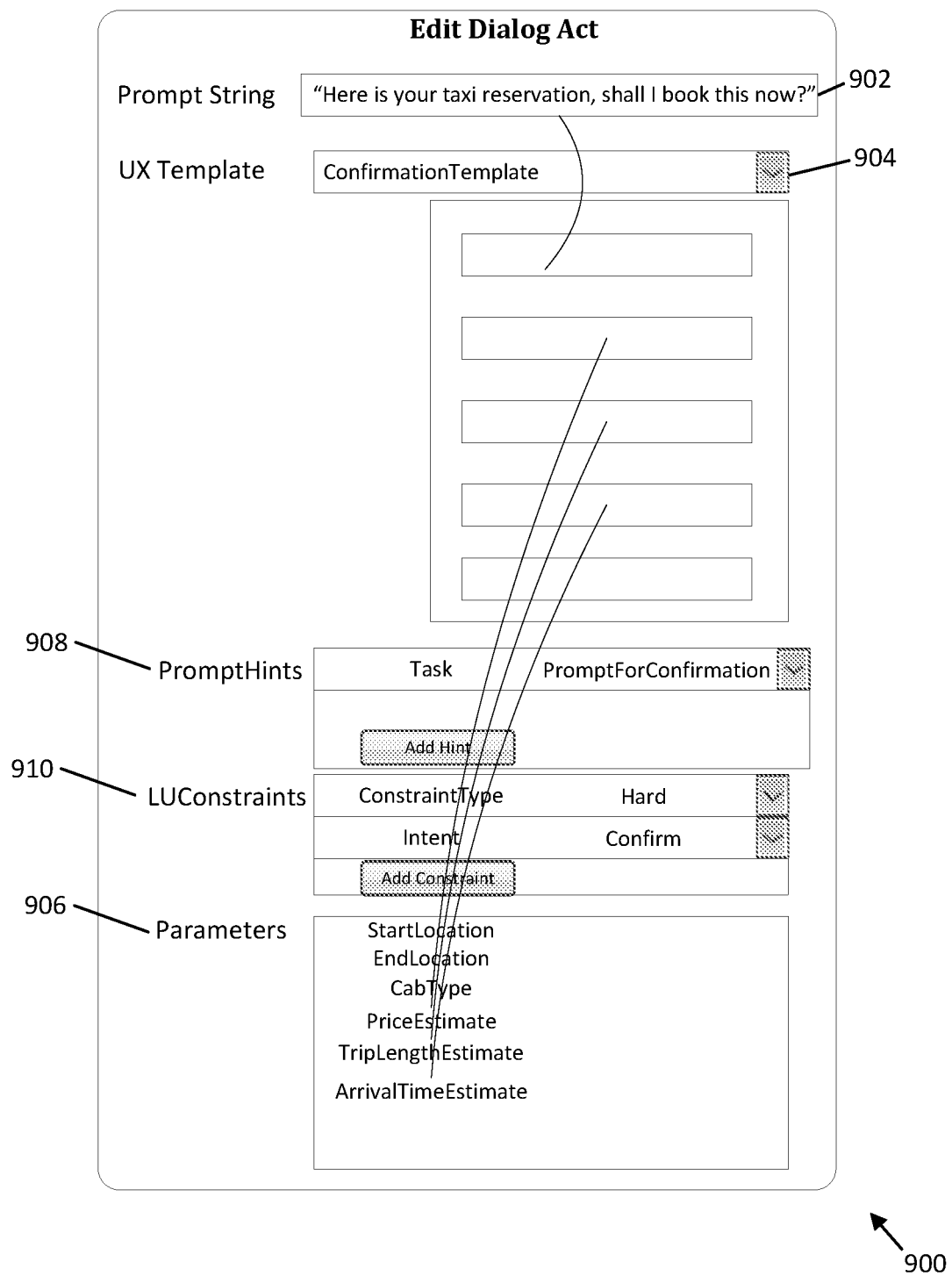
FIG. 9 illustrates an example user interface authoring platform for editing a dialog act.

FIG. 9 illustrates an example user interface authoring platform 106 for editing a dialog act. As illustrated, the dialog act editor 900 includes a text box 902 for inputting a prompt string. The prompt string represents the prompt that is displayed or spoken to the user. This prompt string may be manually entered into the text box 902, or alternatively or additionally it may be selected from a list of prompts. These prompts may be selected from a list of prompts saved in database 108, for example.

The dialog act editor 900 also includes a user interface menu 904 for selecting a user experience or a user interface. As illustrated in this example, the user interface menu 904 is a drop-down menu that allows the author to select a user interface or experience form a previously created template. Based on the selected template, parameters 906 may be populated. Accordingly, the author may select any one of the populated parameters 906.

The dialog act editor 900 further provides the author with the ability to also identify prompt hints 908. Prompt hints 908 are suggestions that may be provided to the user requesting additional information based on the parameters.

The dialog act editor 900 also provides the author with the ability to identify language understanding model constraints 910. In this example, the language understanding model constraints 910 define which parameters are necessary and which parameters are optional. In an example, for taxi booking example, a pickup location would be required, which is identified in the dialog act editor 900 as a "hard constraint" whereas other parameters, such as a destination location might be optional.

Figure 10:
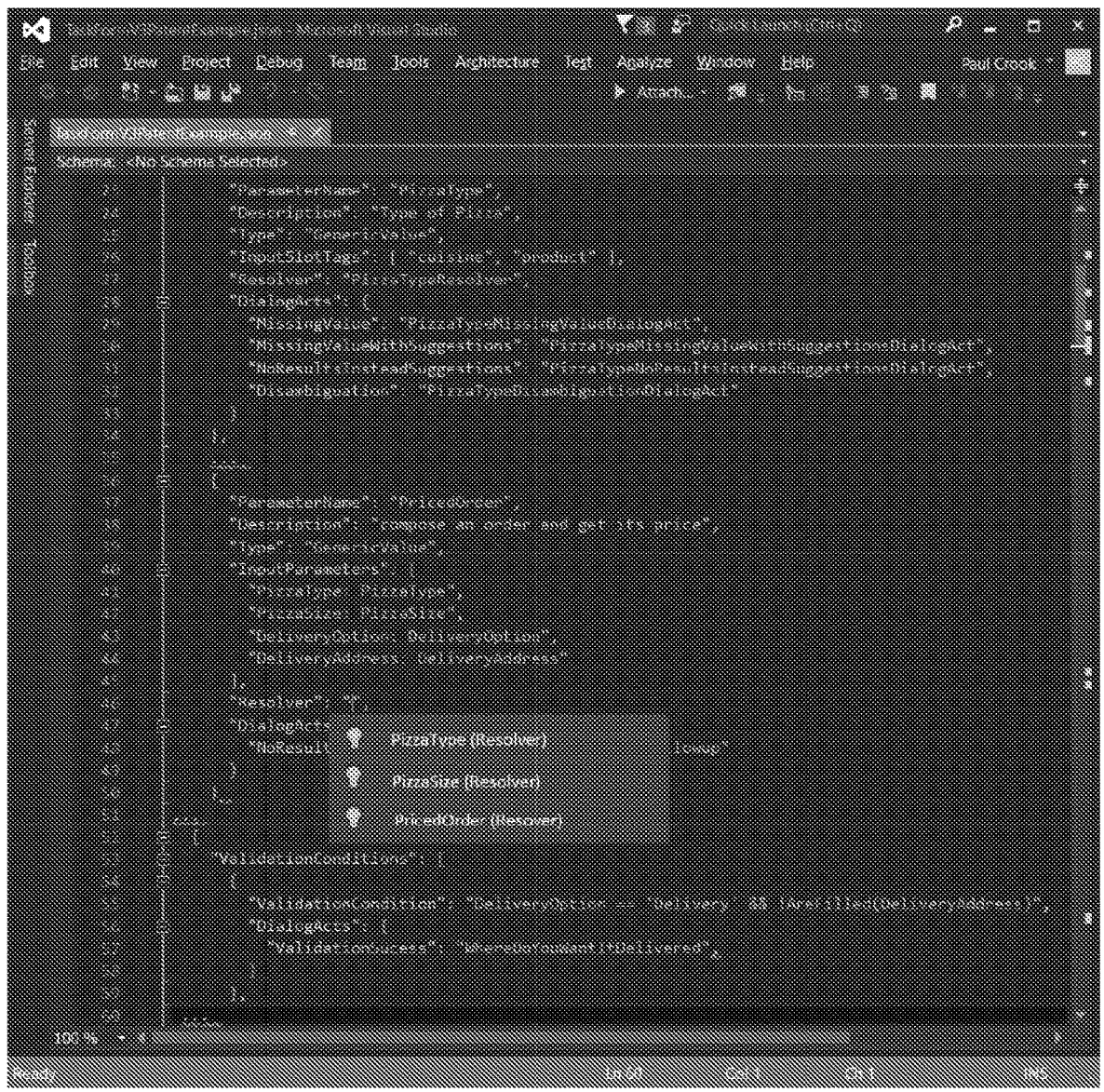
FIG. 10 illustrates a screenshot of an exemplary integrated development environment (IDE) that can be used to define tasks.

FIG. 10 illustrates a screenshot 1000 of an exemplary integrated development environment (IDE) that can be used to define tasks. The IDE is an example embodiment in which an author may define and edit a task, wherein the IDE also includes auto-completion features to assist the author. The example integrated development environment is a software application that provides authors with the ability to define a task using a type of editor such as a text editor or other source code editor alongside build tools to build the task and a debugger to debug errors in the author's code. Such an IDE may be, for example Visual Studio offered by Microsoft of Redmond, Wash. The example IDE allows authors to provide task specifications using a text-like developer tool that is not web-portal based. Such an IDE may also provide support for discovery, auto-completion, suggestions, and syntax correction of task definition files. The IDE may assist authors to build a model of the task in a development environment. In that environment, the models may be constructed in software code, and in some embodiments, models may be a structured document such as WL.

It is understood that FIGS. 3-10 are representative of an example user interface authoring platform and that other configurations are also possible. It is further understood that in some examples, a text box is illustrated, however it is understood that some of the information provided via the user interface authoring platform may be selected from the database 108.

Figure 11:
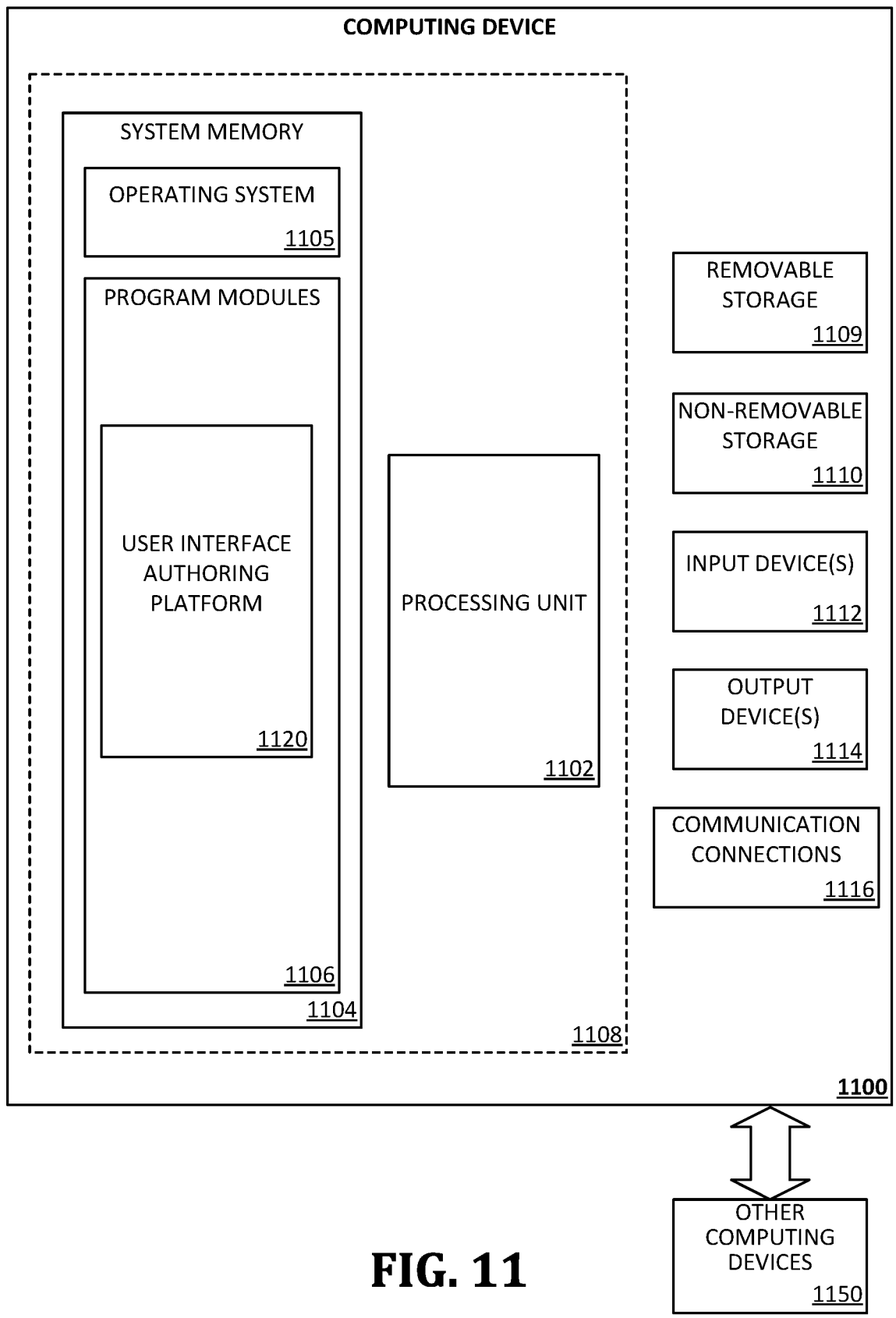
FIG. 11 is a block diagram illustrating example physical components of a computing device with which aspects of the disclosure may be practiced.

FIG. 11 is a block diagram illustrating physical components (e.g., hardware) of a computing device 1100 with which aspects of the disclosure may be practiced. The computing device components described below may have computer executable instructions for implementing a user interface authoring platform 1120 on a computing device including computer executable instructions for the user interface authoring platform 1120 that can be executed to employ the methods disclosed herein. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 suitable for running the user interface authoring platform 1120 or one or more components in regards to FIG. 1. The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., user interface authoring platform 1120) may perform processes including, but not limited to, the aspects, as described herein. Other program modules that may be used in accordance with aspects of the present disclosure, and in particular for providing a user interface authoring platform.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12A:
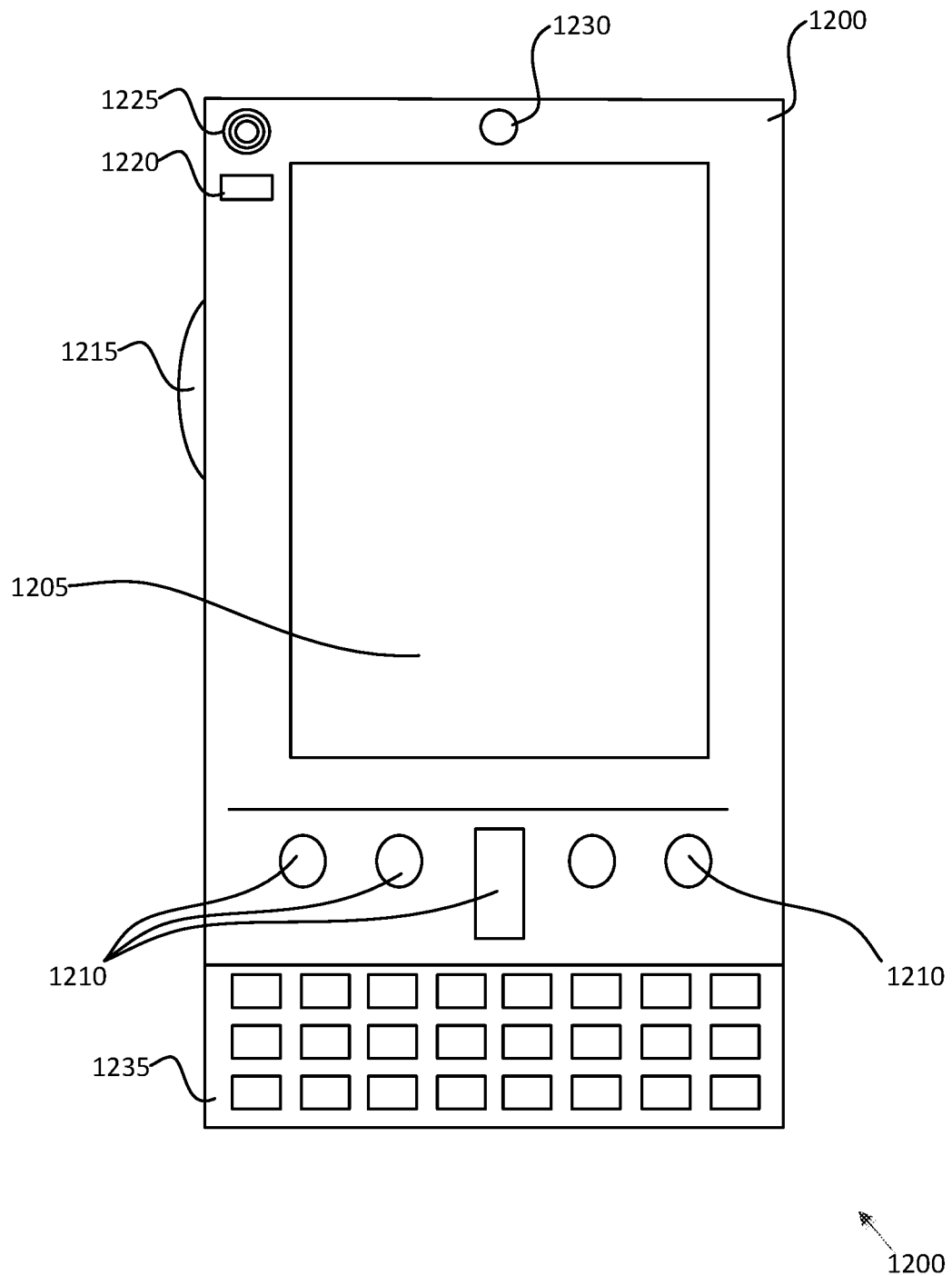
FIG. 12A and FIG. 12B are simplified block diagrams of a mobile computing device with which aspects of the present disclosure may be practiced.
Figure 12B:
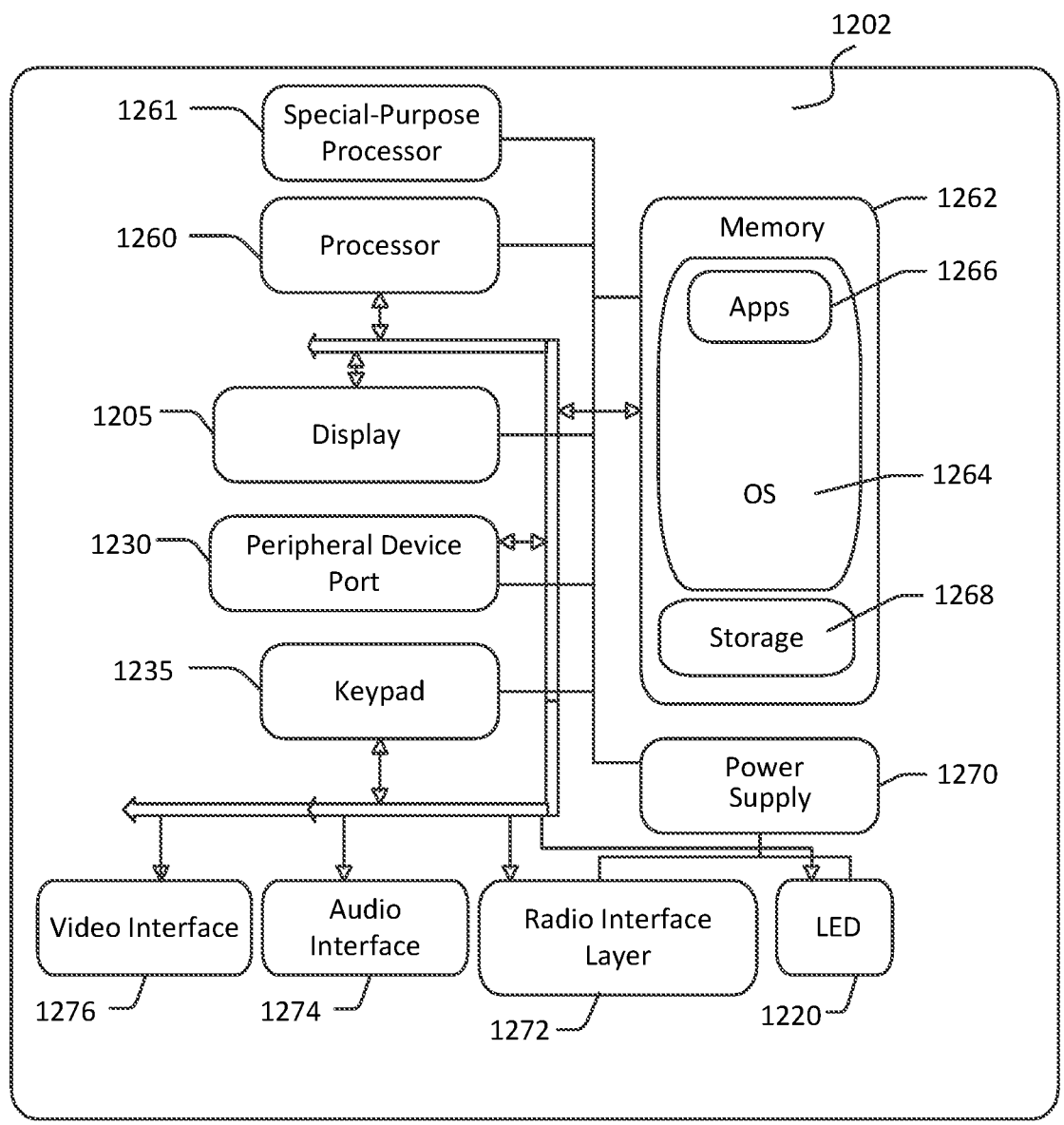

FIG. 12A and FIG. 12B illustrate a mobile computing device 1200, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 12A, one aspect of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative aspects, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some aspects, the mobile computing device 1200 incorporates a vibration transducer for providing the user with tactile feedback. In yet another aspect, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one aspect of a mobile computing device. That is, the mobile computing device 1200 can incorporate a system (e.g., an architecture) 1202 to implement some aspects. In one embodiment, the system 1202 is implemented as a "smart phone" capable of running one or more applications (e.g., browser, e-mail, calendaring, contact managers, messaging clients, games, and media clients/players). In some aspects, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the instructions for providing a user interface authoring platform as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio interface layer 1272 that performs the function of transmitting and receiving radio frequency communications. The radio interface layer 1272 facilitates wireless connectivity between the system 1202 and the "outside world," via a communications carrier or service provider. Transmissions to and from the radio interface layer 1272 are conducted under control of the operating system 1264. In other words, communications received by the radio interface layer 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present disclosure, the microphone may also serve as an audio sensor to facilitate control of notifications, as will be described below. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio interface layer 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio interface layer 1272 or via a distributed computing network. Similarly, such data/information may be readily transferred between computing devices for storage and use according to well-known data/information transfer and storage means, including electronic mail and collaborative data/information sharing systems.

Figure 13:
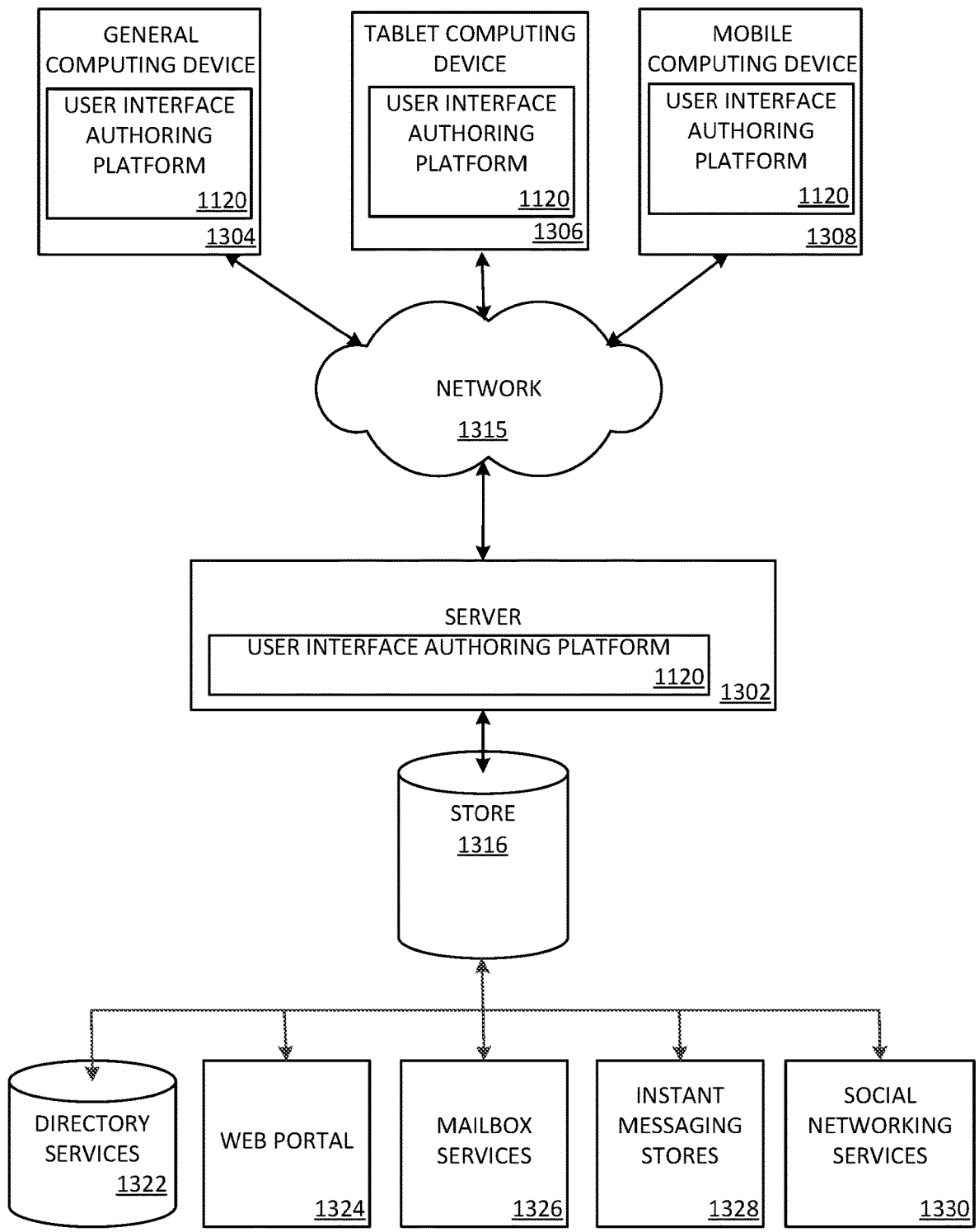
FIG. 13 is a simplified block diagram of a distributed computing system in which aspects of the present disclosure may be practiced.

FIG. 13 illustrates one aspect of the architecture of a system for processing data received at a computing system from a remote source, such as a personal computer 1304, tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking site 1330. The user interface authoring platform 1020 may be employed by a client that communicates with server device 1302, and/or the user interface authoring platform 1020 may be employed by server device 1302. The server device 1302 may provide data to and from a client computing device such as a personal computer 1304, a tablet computing device 1306 and/or a mobile computing device 1308 (e.g., a smart phone) through a network 1315. By way of example, the computer system described above with respect to FIGS. 1-10 may be embodied in a personal computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

Figure 14:
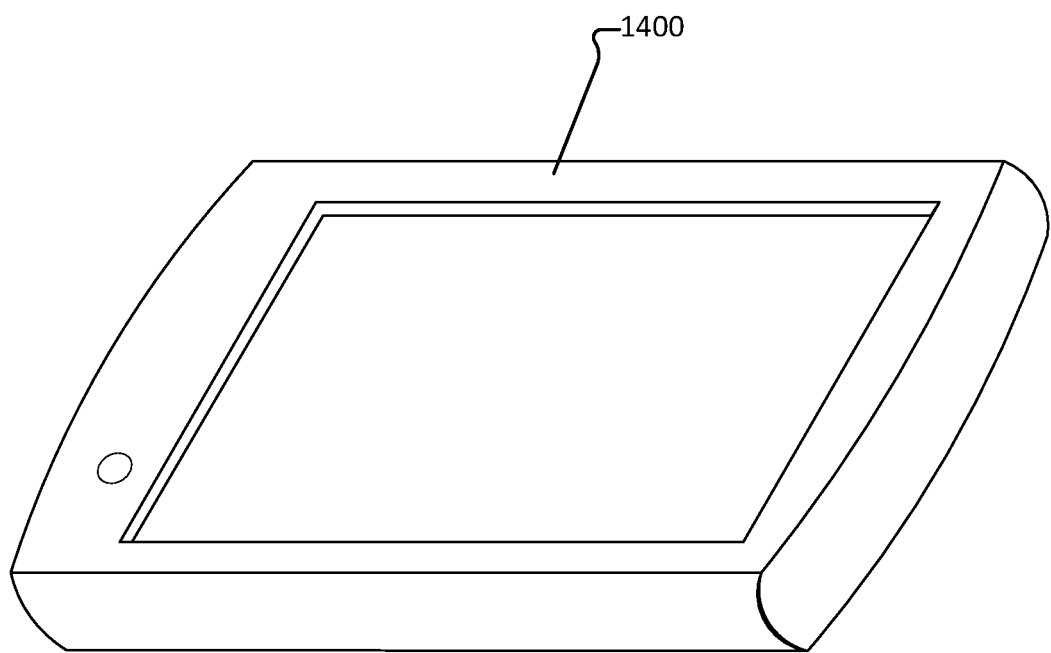
FIG. 14 illustrates a tablet computing device for executing one or more aspects of the present disclosure.

FIG. 14 illustrates an exemplary tablet computing device 1400 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for authoring a task using a user interface authoring platform, the method comprising:
    receiving a definition of a task;
    receiving a selection of a definition of an intent that will trigger the task;
    receiving, based on the selected definition of the intent, a parameter that refines an execution of the task;
    receiving an indication of a resolver for the parameter, wherein the resolver is operable to identify data from received input associated with the parameter;
    receiving information defining a dialog to prompt a user for additional information about the parameter; and
    receiving an identification of the execution of the task.

2. The method of claim 1, further comprising, based on receiving the definition of the task, providing at least one language understanding model related to of the defined task.

3. The method of claim 2, wherein the at least one language understanding model is stored in a shared database among one or more language understanding models.

4. The method of claim 1, wherein receiving the definition of the task further comprises:
    receiving at least one definition of a dialog act.

5. The method of claim 4, wherein the at least one dialog act is one of: a missing value dialog act, a disambiguation dialog act, a no results dialog act, a suggestions dialog act, a selection dialog act, and a confirmation dialog act.

6. The method of claim 1, wherein receiving a selection of the intent that will trigger the task further comprises receiving a selection of a trigger domain corresponding to the intent that will trigger the task.

7. The method of claim 1, wherein receiving a parameter that refines execution of the task further comprises:
- receiving a name of the parameter;
- receiving a type of the parameter;
- receiving a condition of the parameter, the condition indicating whether the parameter is one of a required parameter and an optional parameter;
- receiving one or more slot tags as inputs to resolve the parameter; and
- receiving a resolver for the parameter.

8. The method of claim 1, further comprising:
receiving one or more validation conditions.

9. A system comprising:
- at least one processing unit; and
- at least one memory storing computer executable instructions that, when executed by the at least one processing unit, cause the system to perform a method, the method comprising:
  - receiving a definition of a task;
  - receiving a selection of an intent that will trigger the task;
  - receiving a parameter that refines an execution of the task;
  - receiving, based on the selected definition of the intent, a parameter that refines an execution of the task;
  - receiving an indication of a resolver for the parameter, wherein the resolver is operable to identify data from received input associated with the parameter;
  - receiving information defining a dialog to prompt a user for additional information about the parameter; and
  - receiving an identification of a third party application used for execution of the task.

10. The system of claim 9, wherein receiving the definition of the task comprises receiving a selection of a primary language understanding model of the task stored in a shared database.

11. The system of claim 9, wherein receiving a selection of the intent that will trigger the task further comprises receiving a selection of a trigger domain corresponding to the intent that will trigger the task.

12. The system of claim 9, wherein receiving a parameter that refines execution of the task further comprises:
- receiving a name of the parameter;
- receiving a type of the parameter;
- receiving a condition of the parameter, the condition indicating whether the parameter is one of a required parameter and an optional parameter;
- receiving one or more slot tags as inputs to resolve the parameter; and
- receiving a resolver for the parameter.

13. The system of claim 9, further comprising:
receiving at least one definition of a dialog act, wherein the at least one dialog act is one of:
- a missing value dialog act,
- a disambiguation dialog act,
- a no results dialog act,
- a suggestions dialog act,
- a selection dialog act, or
- a confirmation dialog act.

14. A computer-readable memory storage device, excluding a signal, which stores a set of instructions which when executed performs a method for authoring a task using a user interface authoring platform, the method comprising:
- receiving a definition of a task;
- receiving a selection of an intent that will trigger the task;
- receiving a parameter that refines an execution of the task;
- receiving, based on the selected definition of the intent, a parameter that refines an execution of the task;
- receiving an indication of a resolver for the parameter, wherein the resolver is operable to identify data from received input associated with the parameter;
- receiving information defining a dialog to prompt a user for additional information about the parameter; and
- receiving an identification of a third party application used for execution of the task.

15. The computer-readable memory storage device of claim 14, wherein receiving a definition of the task comprises receiving a selection of a primary language understanding model of the task.

16. The computer-readable memory storage device of claim 14, further comprising:
receiving at least one definition of a dialog act associated with the dialog, wherein the at least one dialog act is one of:
- a missing value dialog act,
- a disambiguation dialog act,
- a no results dialog act,
- a suggestions dialog act,
- a selection dialog act, or
- a confirmation dialog act.

17. The computer-readable memory storage device of claim 14, wherein receiving a selection of the intent that will trigger the task further comprises receiving a selection of a trigger domain corresponding to the intent that will trigger the task.

18. The computer-readable memory storage device of claim 14, further comprising:
receiving one or more validation conditions.

19. The computer-readable memory storage device of claim 14, wherein receiving a parameter that refines execution of the task further comprises:
- receiving a name of the parameter;
- receiving a type of the parameter;
- receiving a condition of the parameter, the condition indicating whether the parameter is one of a required parameter and an optional parameter;
- receiving one or more slot tags as inputs to resolve the parameter; and
- receiving a resolver for the parameter.

20. The computer-readable memory storage device of claim 19, further comprising:
receiving a definition of a dialog act requesting a value of the parameter.

* * * * *